June 28, 1927.  
R. O. HAMMOND  
APPARATUS FOR TOASTING FOOD ARTICLES  
Filed July 12, 1924   5 Sheets-Sheet 1
1,634,142
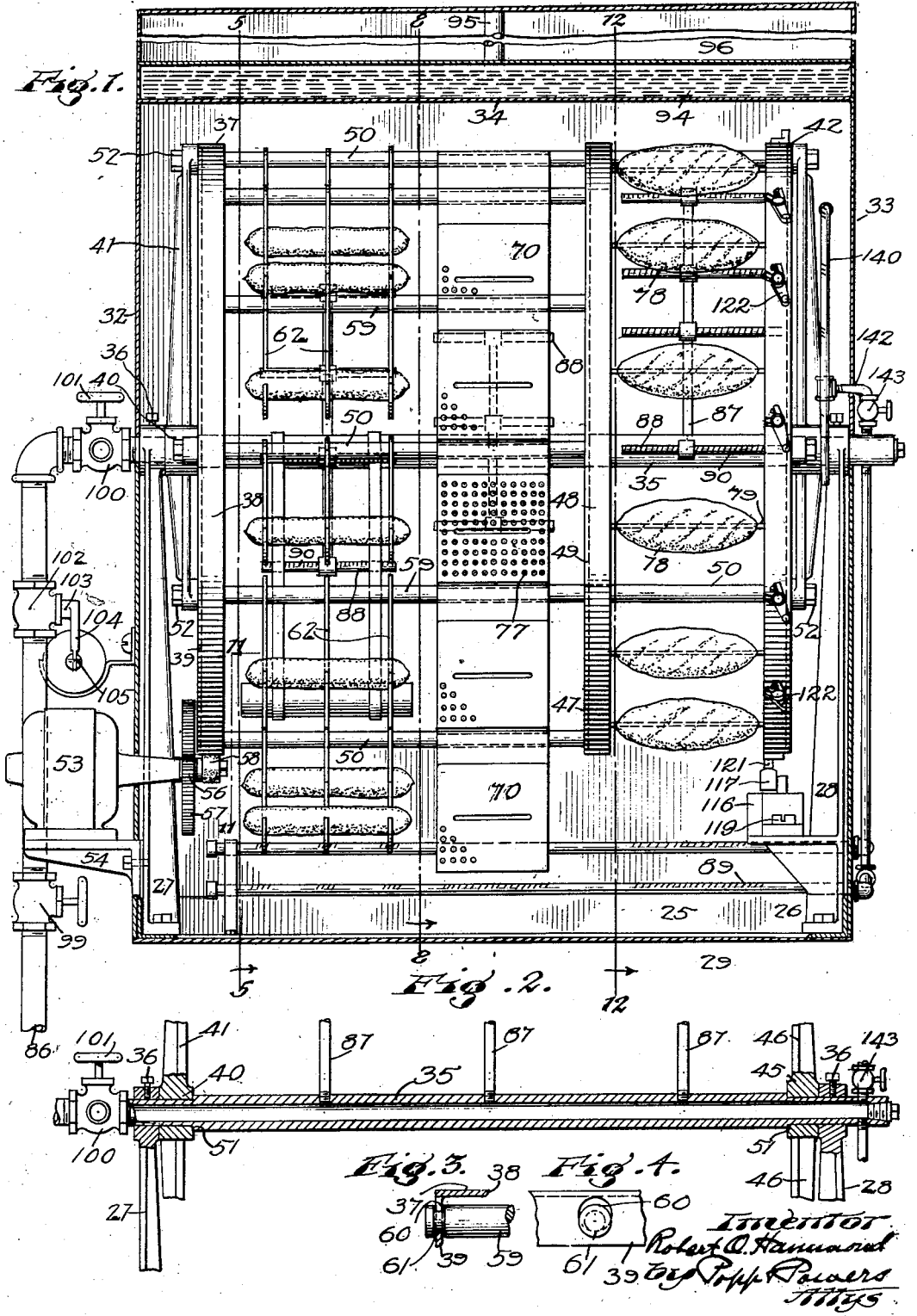

June 28, 1927.                               1,634,142
R. O. HAMMOND
APPARATUS FOR TOASTING FOOD ARTICLES
Filed July 12, 1924        5 Sheets-Sheet 2

Inventor
Robert O. Hammond

June 28, 1927. 1,634,142
R. O. HAMMOND
APPARATUS FOR TOASTING FOOD ARTICLES
Filed July 12, 1924    5 Sheets-Sheet 3
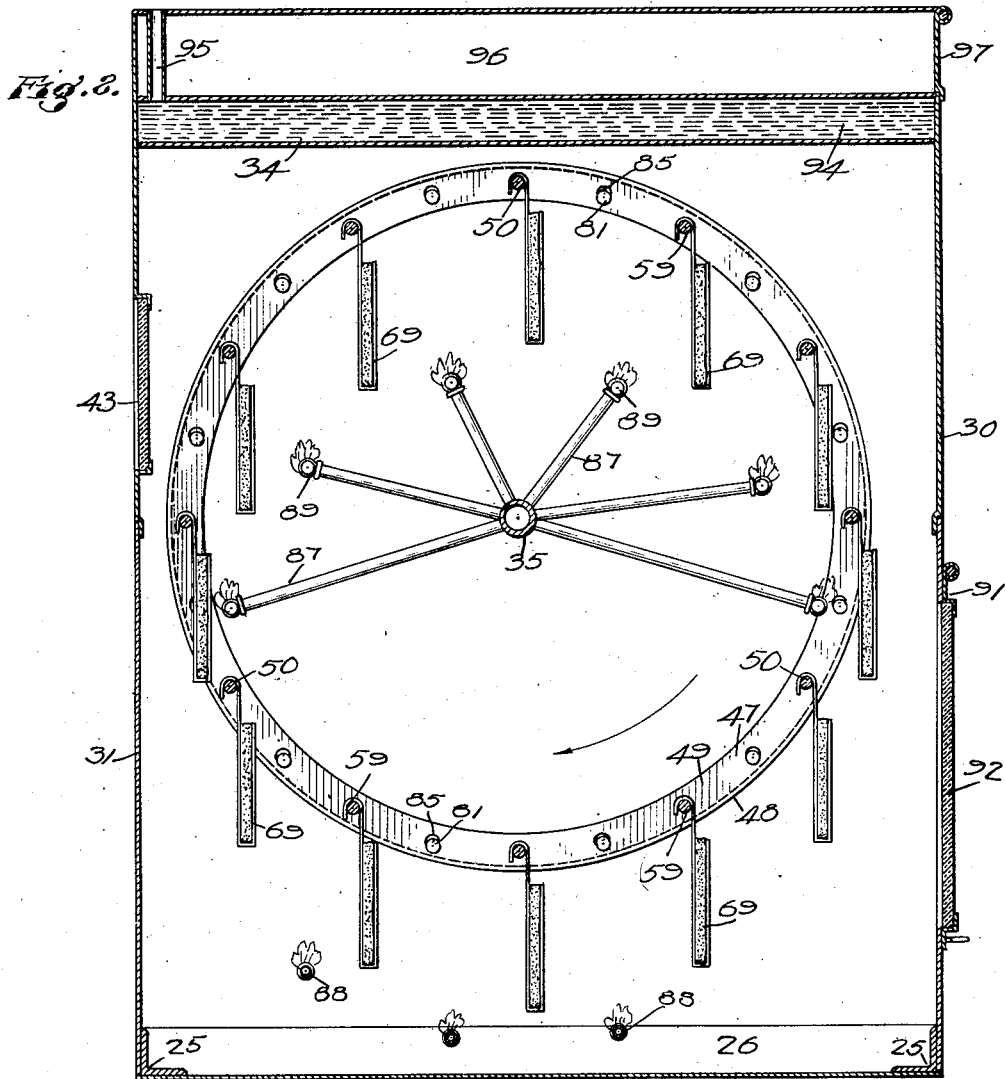
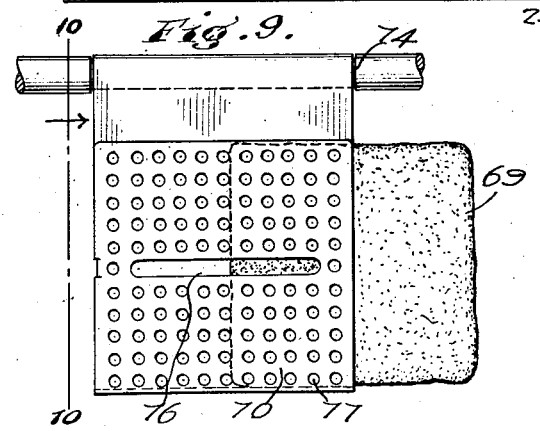
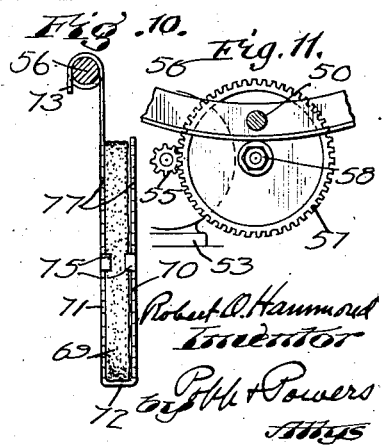

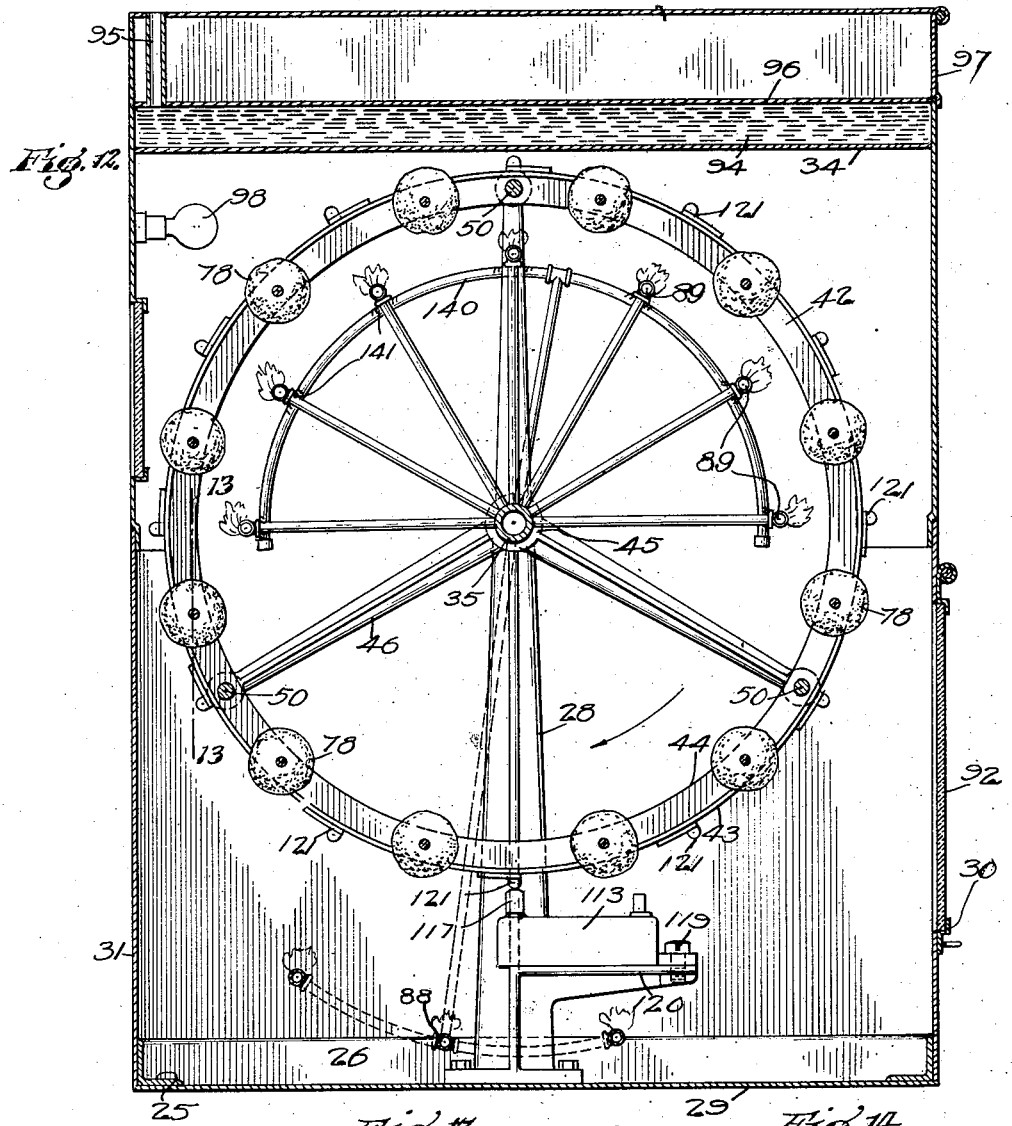
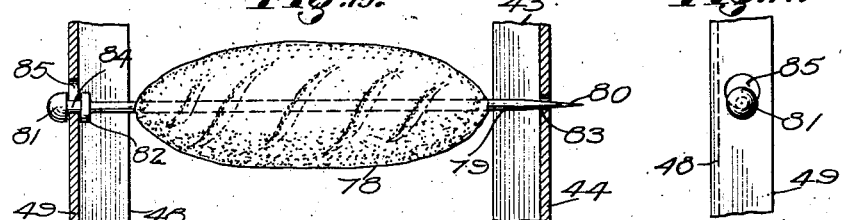
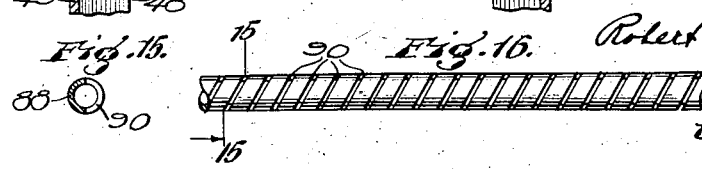

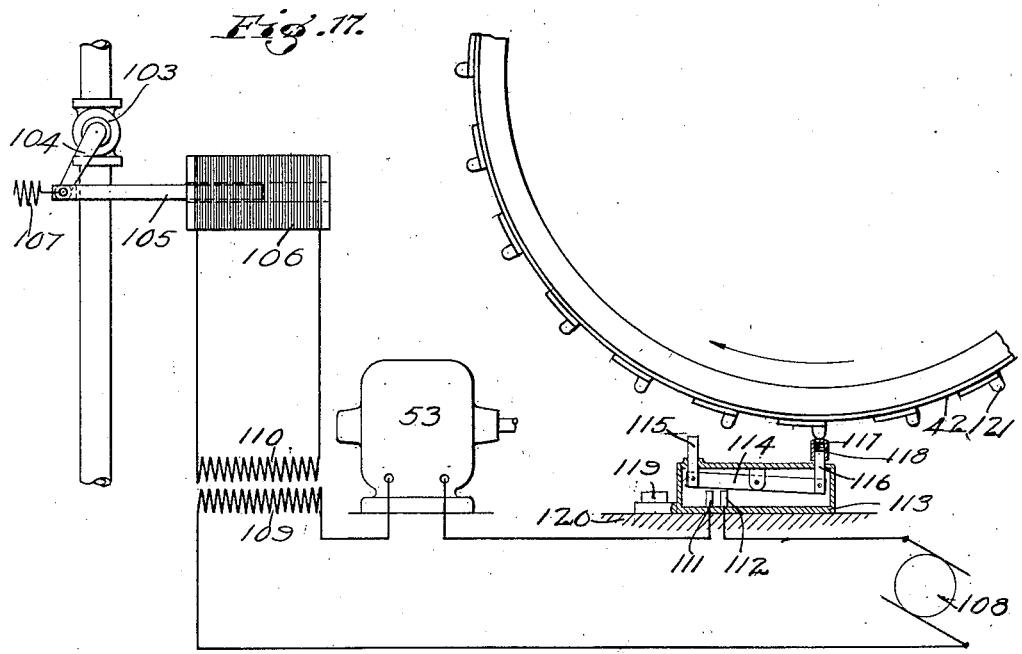
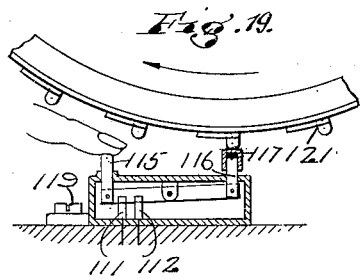
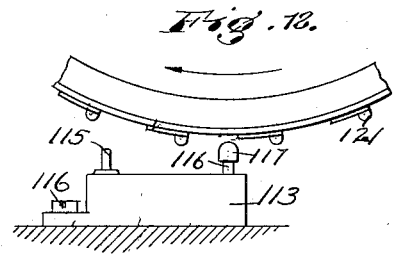
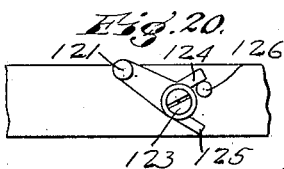
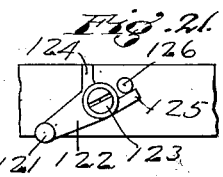
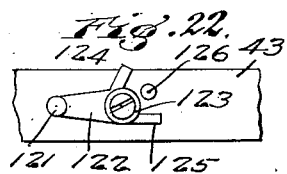
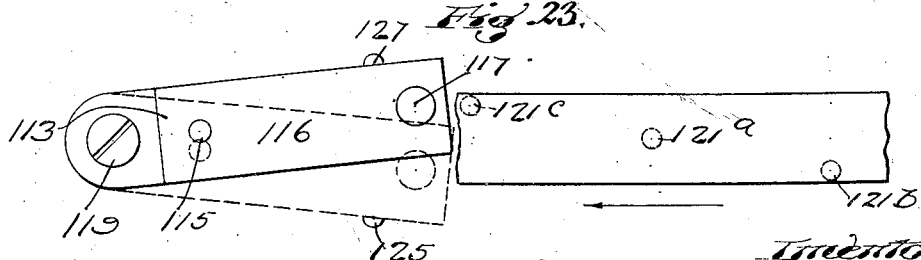

Patented June 28, 1927.

1,634,142

UNITED STATES PATENT OFFICE.

ROBERT O. HAMMOND, OF BUFFALO, NEW YORK, ASSIGNOR TO STANLEY S. JENKINS, OF BUFFALO, NEW YORK.

APPARATUS FOR TOASTING FOOD ARTICLES.

Application filed July 12, 1924. Serial No. 725,720.

This invention relates to an apparatus for toasting food products such as sausages, slices of bread, baked rolls and the like and more particularly to an apparatus of this character which may be utilized for toasting, heating, warming, roasting or cooking such articles and dispensing the same in public places.

One of the objects of this invention is to provide a toasting apparatus for this purpose which is compact in construction and still capable of toasting a comparatively large number of food articles within a given time and also effect the continuous toasting operation so that some of the product will always be in condition for sale to a customer.

Another object of this invention is to so construct the toasting apparatus that it is capable of simultaneously toasting a variety of food articles, such as sausages, slices of bread and bread rolls, and thus keep the same in condition for producing sandwiches or the like which are of uniform condition or temperature.

A further object of this invention is to so organize the several parts that the same are capable of being readily assembled and dismembered for inspection, cleaning and repairs and also are capable of being operated by the expenditure of a minimum amount of power and the heating or toasting effect of the food articles accomplished economically and expeditiously.

A still further object of this invention is to provide means of a selective character whereby the operation of the rotatable support upon which the food articles are mounted will be automatically arrested when the same has made one complete revolution and also permits of automatically arresting the apparatus in such a manner that those parts of the rotatable support upon which the food articles are mounted will be brought to the unloading position and then remain at rest until the operator has unloaded the apparatus and restarted the same, while other stations or other parts of the rotatable support upon which no food articles are mounted will pass the unloading position without being arrested.

In the accompanying drawings

Fig. 1 is a vertical longitudinal sectional elevation of a preferred embodiment of my invention.

Fig. 2 is a fragmentary vertical longitudinal section of the axle of the apparatus and adjacent parts.

Fig. 3 is a fragmentary sectional view showing the manner of mounting each end of a supporting rod detachably upon the reel or drum of the supporting apparatus.

Fig. 4 is a side elevation of the same.

Fig. 8 is a vertical cross section taken on the correspondingly numbered line of Fig. 1 showing the preferred means for supporting slices of bread in the apparatus for toasting the same.

Fig. 9 is a fragmentary front elevation of a holder for slices of bread showing the slices of bread partly removed therefrom.

Fig. 10 is a vertical cross section taken on line 10—10 of Fig. 9.

Fig. 11 is a fragmentary cross section taken on line 11—11 of Fig. 1 and looking in the direction of the arrow associated with this line.

Fig. 12 is a vertical cross section taken on line 12—12 of Fig. 1.

Fig. 13 is a fragmentary vertical longitudinal section taken on line 13—13 of Fig. 12 and showing the preferred manner of supporting a baked roll on the reel or drum.

Fig. 14 is a side elevation of the same.

Fig. 15 is a cross section of one of the burners taken on line 15—15 of Fig. 16.

Fig. 16 is a face view of the burner shown in Fig. 15.

Fig. 17 is a diagrammatic view showing the means for controlling the operation of the motor which drives the reel and the valve which supplies the gaseous fuel for heating the food products which are to be toasted.

Fig. 18 is a fragmentary side elevation of the reel and the switch controlling the circuit of the electric motor which operates the reel, these parts being shown in the relative position in which the switch is closed and the tappets of the reel are disengaged from the switch.

Fig. 19 is a sectional view of the same showing the switch moved in its closed position by the finger of the operator and the operating arm of the switch engaged by a tappet of the drum.

Figs. 20, 21 and 22 are plan views showing the different positions of the tappet on the drum whereby the electric switch of the motor is controlled.

Fig. 23 is a diagrammatic top plan view of the motor switch and the tappets on the drum showing the relation of the same when operated to meet different conditions.

Similar characters of reference indicate corresponding parts in the several views of the drawings.

Figure 5:
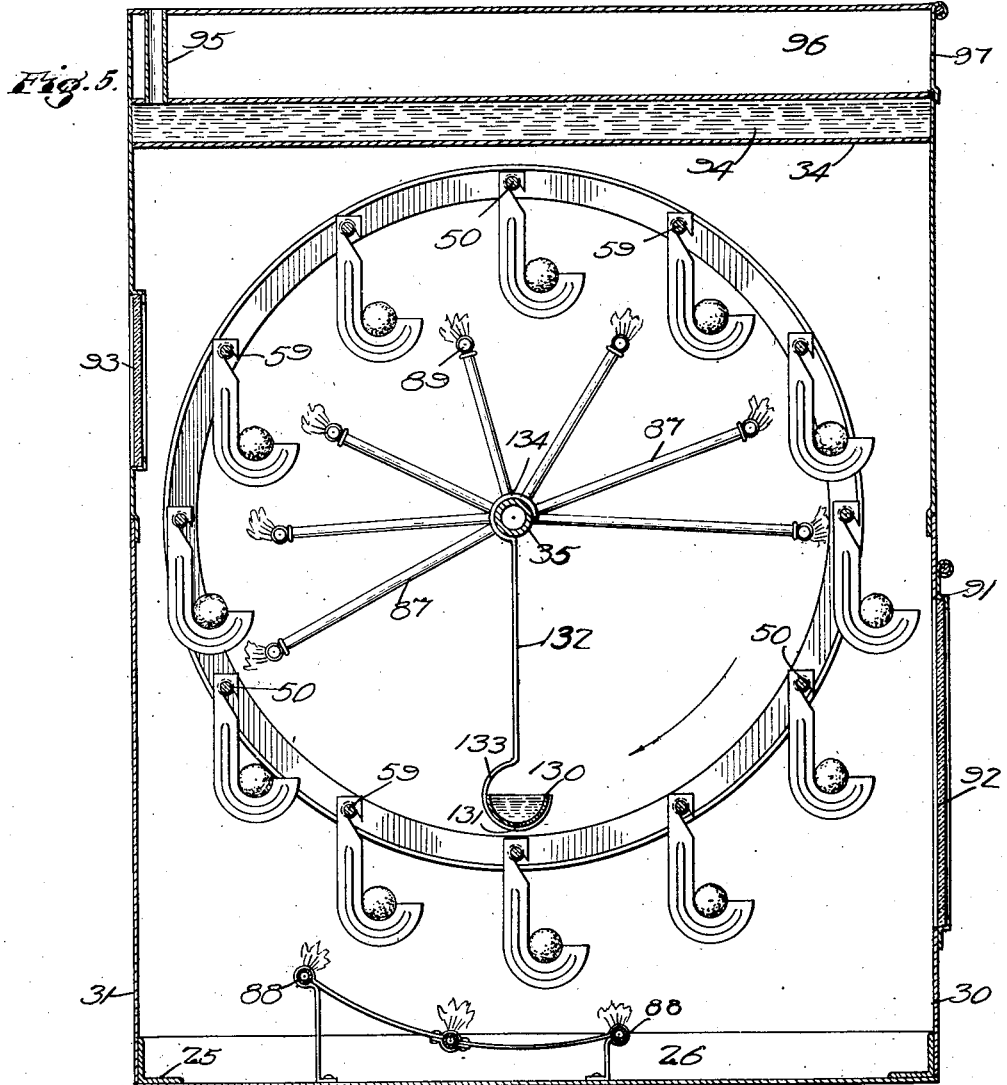
Fig. 5 is a vertical cross section taken on line 5—5 of Fig. 1.

The main operative parts of this apparatus may be of any suitable construction for supporting the working parts and the same is enclosed within a housing or casing for the purpose of confining the heat whereby the toasting of the food products is accomplished. As shown in the drawings this main frame consists essentially of a base made up of two longitudinal bars 25, two transverse bars 26 connecting opposite ends of the longitudinal bars and two standards or uprights, 27, 28, arising from the central parts of the cross bars 26 and secured to their lower ends thereto. The enclosing casing, as shown in the drawings, comprises a horizontal bottom 29, longitudinal front and rear walls 30, 31, transverse walls 32, 33 arranged adjacent to the outer sides of the standards 27 and 28 and a horizontal top 34 connecting the upper ends of the longitudinal and transverse walls.

The space within this enclosing casing forms a toasting or heating compartment in which the food articles or products to be toasted are movably supported and heated or toasted during this movement. These food articles for this purpose are mounted upon the rotatable reel or drum which is constructed of the skeleton or open work form and turns about a horizontal longitudinal axis. This axis in the present case is formed by a longitudinal hollow axle or tube 35 which is supported at its opposite ends on the upper ends of the standards 27 and 28 and secured thereto against rotation by any suitable means, for instance by means of set screws 36 arranged at the upper ends of the standards and engaging with the adjacent parts of the axle. This axle also serves as the main distributing conduit or manifold for the combustible gaseous agent which is supplied to a plurality of burners within the toasting compartment for toasting or cooking the food products therein.

The reel or drum upon which the food articles or products are mounted may be variously constructed but in the present instance the same comprises two end heads or spiders arranged adjacent to the inner sides of the standards and an intermediate head arranged between the two end heads but spaced farther from one head than the other. The reel head or spider at the left hand end of the apparatus in the present instance consists of a ring 37 which is made of angle iron so as to present a peripheral flange 38 and a radial flange 39, a hub 40 rotatively mounted on the left hand end of the axle 35 and a plurality of arms 41 connecting this hub and the ring 37. The end head at the right hand end of the apparatus is constructed in all respects like the left hand head and is provided with an annular rim 42 which is L-shaped or angular form in cross section so as to present a circumferential flange 43 and a radial flange 44, a hub 45 journaled on the left hand end of the axle 35 adjacent to the inner side of the standard 28 and a plurality of arms 46 connecting a hub 45 with the rim 42. The intermediate head preferably consists merely of an annular rim or ring 47 which is also of angular or L-shape form in cross section so as to present a peripheral flange 48 and a radial flange 49. The several heads are arranged concentrically relatively to the axle 35 and the same are rigidly connected with each other by a plurality of longitudinal connecting rods 50, three of which are preferably employed and disposed equidistant around the reel and pass through the radial flanges of the several reel heads and secured thereto as well as to the arms 41 and 46 of the left and right hand reel heads. The hubs 40 and 45 of the end reel heads preferably abut against outwardly faced shoulders 51 of the adjacent parts of the axle and the same are held in an assembled position with the connecting rods 50 and the supporting arms 41 and 46 by means of screw nuts 52 arranged on the outer ends of the supporting rods 50 and engaging with the outer sides of the reel arms 41 and 46 as shown in Figs. 1 and 2.

This reel may be turned in a variety of ways. It is preferable, however, to drive the same by a prime mover in the manner indicated in Figs. 1 and 11. As there shown these driving means comprise an electric motor 53 arranged adjacent to the outer side of the casing wall 32 and mounted on a bracket 54 projecting laterally from the left hand standard 27 and having its driving shaft 55 projecting through the wall 32 into the compartment formed by the casing, a driving pinion 56 secured to the inner end of this driving shaft, an intermediate driven gear wheel 57 pivotally mounted on the inner side of the adjacent standard 27, and a friction pinion 58 connected with the gear wheel 57 and engaging with the periphery of the flange 38 of the left hand reel head.

In the space of the reel between its left hand and intermediate heads a plurality of auxiliary supporting rods 59 are mounted on the rims of these heads which rods, together with the rigid rods 50, serve as the supports upon which are mounted the holders whereby such food articles as sausages and slices of bread are mounted on the reel for the purpose of toasting, roasting or cooking the same. Each of the auxiliary supporting rods 59 is preferably so mounted on the left hand and intermediate heads that the same is capable of being readily applied thereto and detached therefrom for convenience in dismembering the parts when cleaning them and thereby enable the same to be kept in a sanitary condition with the least expenditure of time and labor. This is preferably accomplished by providing the radial flanges 39 and 49 with an annular row of openings 60, each of which is of larger diameter than the diameter of one of the auxiliary supporting rods 59 and providing each of the latter at its opposite ends with a reduced neck 61 so that these rods can be pushed through the corresponding openings 60 of the left and intermediate heads and the necks 61 thereof engage with the lower sides of these openings whereby the shoulders formed on these rods at opposite ends of the necks will operate as stops and engage with opposite sides of the radial flanges 39 and 49 of these heads and thus prevent lengthwise displacement of these rods thereon when the apparatus is assembled and in operation but permitting easy detachment of these rods from the reel when it is desired to clean them.

Figure 6:
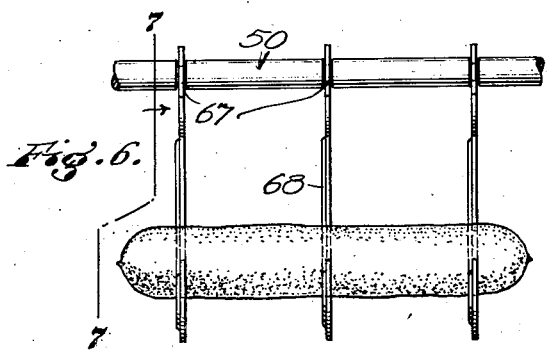
Fig. 6 is a fragmentary front elevation of a preferred form of holder for supporting a sausage on a supporting rod of the reel or carrying drum.
Figure 7:
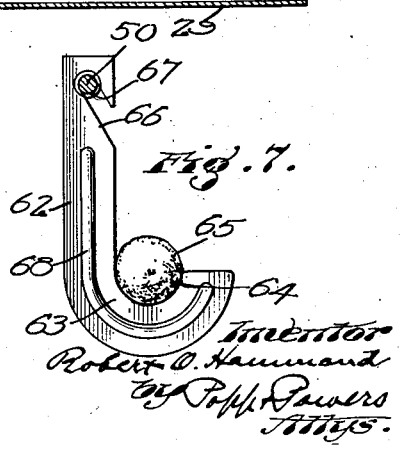
Fig. 7 is a cross section of the same taken on line 7—7 of Fig. 6.

In the preferred construction a plurality of holders are mounted in an annular row upon the main and auxiliary supporting rods 50 and 59 adjacent to the left hand head, which holders are more particularly designed for supporting a plurality of sausages in a position lengthwise of the apparatus and in an annular row relative to the axis of the reel. Each of these sausage holders preferably comprises a plurality of hangers arranged in a longitudinal row and each hanger having an upright arm 62, an upwardly turned hook-shaped lower end 63, the upper side of which forms a seat 64 for a part of the sausage 65 and the upper end of the arm being provided with a downwardly open inclined slot 66 so that this end of the hanger has substantially the form of a hook which is adapted to engage over a part of one of the longitudinal supporting rods of the reel. Although the number of hangers in each holder may be varied it is satisfactory to employ three of them in order to properly support a sausage near the middle and adjacent to opposite ends thereof, as shown in Figs. 1 and 6. In order to maintain the several hangers of each sausage holder in a properly spaced relation on the respective supporting rod the latter is provided at suitable intervals with reduced necks or grooves 67, each of which is adapted to receive the upper hook of one of the sausage hangers and thereby permit this holder to always be suspended in a pendant position from the respective supporting rod as the reel rotates but preventing the hangers from shifting their position lengthwise of the respective rod and thereby insuring a proper support for the sausage. Each of these hangers is preferably constructed of sheet metal and the same is stiffened so as to avoid bending the same out of shape when in use, by providing the lower part of the hanger with a bead or corrugation 68, as shown in Figs. 5, 6 and 7. This form of hanger not only permits of readily placing a sausage to be toasted or cooked on the seats of the several hangers forming this holder as well as removing the same therefrom but it also supports the sausage with a minimum amount of its surface in contact with the holder so as to insure toasting or cooking of all parts of the sausage with substantial uniformity. This form of holder also permits of supporting the sausage without perforating the same or breaking any part of its skin but instead leaving the same in a perfect condition most acceptable to the trade which is served.

In the space of the reel between the annular row of sausage holders and the intermediate head of the same is arranged an annular row of holders which are more particularly designed to hold slices of bread 69 which are to be toasted or heated and served either with the sausage or with other food products. Each of these bread slice holders in the preferred form shown in the drawings comprises front and rear upright walls 70, 71 which are arranged lengthwise of the reel and disconnected at their upper and vertical edges while their lower edges are connected by a horizontal bottom 72. The rear wall 71 is provided at its upper edge with a hook 73 which is adapted to engage with the adjacent part of one of the supporting rods 50, 59 and pivotally support the respective bread slice holder thereon in a pendant position in which it is maintained by the weight of this holder together with the slice of bread 69 which is inserted between the walls thereon and resting on its bottom. The longitudinal movement of each holder on the respective supporting rod is prevented by providing the latter with a reduced portion or neck 74 which is adapted to be engaged by the hook 73 of the bread slice holder and forms shoulders on this rod which are adapted to be engaged by opposite ends of the hook 73 and thus prevent the holder from moving lengthwise on this rod.

Two of the corresponding vertical edges of the walls of the bread slice holder are preferably provided with stops or lugs 75 which project toward each other and serve as means for arresting the motion of the slices of bread which may be slid into this holder from the opposite end thereof which latter is unprovided with such stop lugs. After toasting this slice the same may be conveniently removed from that vertical end thereof which is unprovided with stop lugs 75 by passing a fork or similar instrument through a longitudinal horizontal slot 76 in the front wall of this holder and sticking the same into the toasted slice of bread, after which the latter may be forced longitudinally out of that end of the bread slice holder which is free from obstructions. In order to permit the heat within the chamber of the toasting apparatus to reach considerable area of the slice of bread to be toasted the front and rear walls of this bread slice holder are provided with a plurality of perforations 77 which exposes the bread over a considerable area to the heat and facilitates toasting of the same.

Between the intermediate head and the right hand head of the reel a plurality of baked rolls 78 or the like are adapted to be supported in position for passing them adjacent to burners which furnish heat for warming or toasting these rolls. The preferred means for supporting these rolls in this position consist of a plurality of horizontal skewers 79 which have pointed front ends 80 and by the same may be immediately pushed through the roll lengthwise thereof while its rear end is provided with two collars 81, 82 which are spaced apart and form a neck therebetween, the pointed front end of this skewer being adapted to engage with an opening 83 in the radial flange 44 of the right hand reel head while the neck 84 on the front end of the skewer engages with the lower edge of an opening 85 in the radial flange 49 of the intermediate reel head, thereby holding the skewer against longitudinal movement on the reel but permitting the roll to turn on the reel. The opening 85 is larger in diameter than the outer head or collar 81 at the rear end of the skewer so as to permit these parts to be readily assembled and dismembered.

Although various means may be employed to furnish heat for producing the toasting, warming or cooking effect on the food articles which are carried round upon the reel, it is preferable to employ for this purpose a fuel gas, the supply of which is conducted to one end of the hollow axle or distributing pipe 35 by means of a supply pipe 86 which derives its supply from any suitable source. From the distributing pipe 35 which acts as a manifold the gas is delivered by means of branch pipes 87 to a plurality of external burners 88 arranged within the toasting compartment below the path of the food articles mounted on the lower part of the reel and a plurality of internal burners 89 arranged adjacent to the underside of the path of the food articles which are mounted on the upper part of the reel. The external burners are preferably three in number and arranged in a row which is substantially concentric with the axis of the reel, and the internal burners 30 which are preferably seven in number are also arranged in a row which is substantially concentric with the axis of the reel. Each of these burners is provided with a longitudinal row of slits 90 which are arranged obliquely relatively to the length of the burner and sufficiently close together so that the gas issuing from each of these slits in the form of a flat flame will overlap at its opposite ends with the corresponding ends of adjacent flames issuing from the neighboring inclined slits of the same burner. By this means a continuous flame will be produced from one end of the burner to the other, which flame when directed toward the path of the food products which are carried past the burner by the holders of the reel, will operate to produce a uniform toasting, heating or warming effect upon each food article as the same is moved by the reel past each burner, thereby expediting the operation of toasting or cooking the food article and enabling a large number of customers to be served within a given time.

The food articles are preferably placed upon the holders of the reel at a loading or unloading place located on the lower rear part of the reel, at which point the rear wall 30 of the enclosing casing is provided with an opening which is normally closed by a swinging door 91 and which is provided with a transparent pane 92 so that when this door is closed the attendant can observe the position of different parts of the reel and the holders thereon and also the progress of the toasting, warming or cooking operation. On the upper part of the front wall 31 of the enclosing casing a transparent window 93 is preferably provided which will enable the customers standing in front of the apparatus and waiting to be served to observe the operation of toasting, warming or cooking the food products as the same progresses within the compartment.

Above the toasting compartment is arranged a water chamber 94 which may be filled with water through an inlet 95 leading to the top of the apparatus, which water is heated by the flames within the toasting compartment and not only prevents undue loss of heat by upward radiation but also serves as a means of warming a compartment 96 arranged above the water chamber 94 and adapted to store rolls to keep them in a warm and soft condition. Access to this warming chamber 96 is afforded through an opening in the rear side thereof which is normally closed by a swinging door 97.

For the purpose of enabling the attendant and customer to observe the operation in the interior of the apparatus an electric lamp 98 is mounted on the upper part of the front wall within the compartment for lighting purposes.

The main gas supply pipe 86 is provided with a main hand operating valve 99 whereby the supply of gas may be turned on or off manually. Adjacent to the outer side of the compartment this gas supply pipe is also provided with an air mixer 100 which is provided with a valve 101 whereby external air may be mixed with the gas as it passes through the burners in order to secure the right proportion of gas and air to effect a thorough and economical combustion of the same within the toasting compartment and thereby enable the amount of air mixed with the gas to be regulated in accordance with the richness of the gas or other conditions.

Between the main valve 99 and the air mixer 100 the gas supply pipe is provided with an automatic cut-off valve is associated with the electric motor 53 and the means which control this motor so that when the supply of electricity to this motor is cut off the shut-off valve will be also closed and thereby either extinguish the flame of the burner or reduce the size of this flame to such an extent that no objectionable results will be produced within the cooking or toasting compartment when the reel is not in motion. The automatic shut-off valve may be of any suitable construction, that shown in the drawings consisting of a casing or body 102 having its inlet and outlet connected in trend with the sections of the gas supply pipe 86 and the passage therethrough controlled by a rotatable plug 103 which is provided on the exterior of the valve with a rock arm 104 for actuating the same and turning the plug into its open and into its closed or nearly closed position.

The opening of this shut-off valve is effected by means of a solenoid magnet, the core 105 of which is connected at one end with the valve arm 104, while its opposite end is arranged within the electromagnetic coil 106 so that when the latter is energized by passing a current therethrough the solenoid core will be drawn inwardly into the coil and the valve plug 103 will be open for permitting the passing of gas from the supply pipe to the distributing burners within the toasting compartment. When the current to the coil 106 is broken a spring 107 connected with the core 105 and the arm 104 will turn the valve plug 103 in the opposite direction for either fully closing this valve and shutting off the flow of gas therethrough or partially closing the same so as to permit only a small flame in the burners, this being determined by the adjustment of the parts in accordance with the manner in which it is desired to operate this apparatus.

The current operating the solenoid magnet is preferably derived from the same source which operates the prime motor 53 so that when the current is turned off or turned on in this motor a corresponding action will take place in the solenoid magnet for the purpose of causing the automatic shut-off valves 102, 103 to be closed when the motor stops running and to again open these valves when the motor is started. The current in the present case is derived from an electric generator 108 which includes in its circuit the field winding of the motor 53, also the primary 109 of a transformer and also the contacts of an electric switch. The secondary 110 of the transformer which co-operates with the primary 109 has its opposite ends connected with the opposite ends of the coil 106 of the solenoid magnet. It follows from this construction that when the circuit which includes the primary 109 and the motor 53 is broken the absence of induction from the primary 109 to the secondary 110 will de-energize the coil 106 and permit the switch 107 to move the valve plug 103 into a closed or nearly closed position, but when the circuit including the generator 108, motor 53 and primary 109, is closed then the current induced from the primary to the secondary of the transformer will energize the coil 106 and cause the valve plug 103 to be turned into an open position so as to again supply the burners of the toasting apparatus with a normal amount of gas.

Although the switch mechanism which controls the opening and closing of the circuit of the electric motor may be varied it is preferably so constructed that the operator can set the same to permit a complete rotation of the rotary reel in the toasting compartment and can be also set so as to arrest the rotation of this reel at different predetermined stations while permitting the same to turn with certain other stations past the loading and unloading places of the apparatus and can also be so set that the reel may be turned continuously. This switch mechanism in its preferred form, as best shown in Figs. 1, 12, 17–23, is constructed as follows:

111 and 112 are two stationary switch contacts which are mounted on the bottom of the housing 113 and connected with the circuit of the electric generator 108, prime motor 53 and primary 109. These two stationary contacts are electrically connected and disconnected by means of a knife switch 114 having a form of a lever which is pivoted to the top of the housing 113 so that the front arm thereof which is of metal may be moved into and out of engagement from the fixed contacts 111, 112 for the purpose of making or breaking the generator, motor and magnet circuit. This switch lever is pivotally mounted on the housing sufficiently tight that the same will be made frictional either in its open or closed position and the same may be moved into its closed position by means of a finger piece 115 guided on the front part of the switch housing and connected at its lower end with the front arm of the switch lever 114. On the rear arm of the switch lever the same is provided with an upwardly projecting shifting pin 116 having a yielding top section 117, this top section being preferably constructed in the form of a cap which fits over the lower section 116 and the top section being yieldingly held in its elevated position by means of a spring 118 interposed between the upper end of a pin section 116 and the bottom of the cap section 117. The housing 113 is pivotally mounted at one end by means of a pin 119 or the like upon a stationary part 120 of the frame of the apparatus so that the upper end 117 of the rear switch pin may be moved into one or the other of three circular paths through which tappets 121 are adapted to move while mounted in a circumferential row on the periphery of the circumferential flange 43 of the right hand or rearmost head of the reel. The tappet 121 is provided on this rear head of the reel adjacent to each circumferential station of the reel at which a sausage, a slice of bread or a baked roll may be supported in position to be toasted or cooked in its circumferential path round the axis of the reel. Each of these tappets 121 is mounted on a lever 122 which is pivoted at its rear ends by means of a pin or screw 123 to the circumferential flange 43 of the rear reel head so that the tappet 121 may be moved either into a central neutral position as indicated by full lines in Fig. 22 and by dotted lines 121ª in Fig. 23 or the same may be moved into a position at the right of this neutral position as shown by full lines in Fig. 21 and by dotted lines 121ᵇ in Fig. 23 or the same may be moved toward and into position at the right of this central position as indicated by full lines in Fig. 20 and by dotted lines 121ᶜ in Fig. 23. The movement of each of the tappet arms 122 is limited in either direction by means of stop lugs 124, 125 thereon engaging with a stationary pin 126 on the periphery of the rear reel head, and the swinging motion of the switch casing 113 is limited in both directions by means of stops 127, 128 arranged on opposite sides of this casing, as shown in Fig. 23.

*Operation.*

For the purpose of starting this apparatus the attendant depresses the slot arm of the switch lever 114 by pushing his finger downwardly on the front finger piece 115, as shown in Fig. 19, thereby closing the circuit across the contacts 111, 112 so that the motor begins to operate for turning the reel and the solenoid magnet opens the plug 103 of the automatic gas valve and permits gas to flow to the burners which are lighted by the attendant so as to produce flames whereby the toasting, roasting or cooking effect is to be obtained. If the attendant should depress the slot arm of the switch lever when the shifting pin on the rear arm thereof is immediately below one of the tappets of the drum this will not interfere with the closing of the switch lever inasmuch as the spring 118 at this time would be nearly compressed by the upward movement of the rear switch lever arm as the cap 117 of this rear arm engages this tappet, as shown in Fig. 19. This spring 118 is, however, strong enough to render the pin sections on the rear arm of the switch lever practically rigid and causes the rear arm of the switch lever to be depressed, and the switch opening, when one of the tappets 121 engages with the upper section 117 of the shifting pin, thereby depresses the same for opening the circuit across the switch contacts 111 and 112. By this means interfering with the closing of the switch under such conditions is prevented. The attendant can load each of the holders with a sausage, slice of bread and roll at the loading or unloading station or any one of them as the case may be while the reel is rotating continuously in the direction of the arrows in Figs. 5, 12 and 17 or while intermittently interrupting the rotation of the reel, while the station to be loaded or unloaded is at the loading and unloading place within the compartment. This operation is continued until as many stations as desired have been loaded with articles of food on the holders in the several annular rows. It is preferable to so time the reel that the operation of toasting a sausage, slice of bread or roll will be effected during one complete rotation of the reel, a sufficient number of burners being provided for this purpose so that the flames issuing therefrom will cross the path of the several rows of articles of food and operate upon such articles sufficiently effective that the toasting thereof will be completed between the time that each article is put on its holder by the attendant and carried past the several burners during its circular path and then comes back to the place of beginning. If the attendant desires to arrest the reel at the end of one complete rotation he moves the first tappet 121 upon beginning the loading of the apparatus to the right of the central remote position as indicated by dotted lines 121ᶜ in Fig. 23 and full lines in Fig. 20 and also moves the switch casing 116 toward the right so that the outer section 117 of its automatic switch opening pin is arranged in the path of the tappet 121ᶜ while the remaining tappets are moved either into the central position indicated by dotted lines 121ª in Fig. 23 and full lines in Fig. 22 or the tappet may be shifted to the extreme right as indicated by full lines in Fig. 21 and by dotted lines 121ᵇ in Fig. 23. When the parts are in this relative position the reel upon making a complete turn will engage its operative tappet 121ᶜ with the outer section 117 of the switch opening pin and thereby turn the switch lever 114 so as to break the circuit across the switch contacts 111 and 112 and thereby cause the rotation of the reel to be arrested and the gas to be either turned off or turned low. After the reel has thus made one complete rotation at which time it is assumed the food articles on the stations of the several annular rows on the reel have been completely toasted, warmed or cooked, then the operator or attendant opens the rear door 91 and takes off the finished food products and replaces them by another set of unfinished products during which time the reel remains at rest. He also turns all of the remaining tappets 121 into the right hand circular path as indicated by full lines in Fig. 21 and by dotted lines 121ᵇ in Fig. 23. The attendant also shifts the switch casing 116 from the extreme left hand position where it engages the stop 127 to the extreme right hand position so that it engages the stop 128, therefore making the top of its shift pin 117 in line with the right hand path of the tappets represented by the dotted line 121ᵇ in Fig. 23. When the parts are shifted in the position thus described each of the tappets 121 will successively engage the top of the switch opening pin and depress the same so that the switch lever 114 is disengaged from the contacts 111, 112 and thereby arrest the rotary motion of the reel at the end of each step so that each station will come to rest at the loading and unloading place. As the attendant removes the food products from the holders at each station he may either reload the same or leave them empty and then shift the switch lever 114 so as to again rotate the reel another step forward. If the attendant reloads the holders at the station he leaves the tappet 121 in the right hand position marked by dotted line 121ᵇ in Fig. 23 so that the reel will be automatically arrested in its rotation when the respective station again reaches the loading and unloading places but if no food products are placed upon the respective stations of the reel then the tappet 121 associated with this station is moved into the neutral or central position represented by the dotted line 121ª in Fig. 23 so that the reel will not be arrested when that particular station arrives at the loading and unloading places. If it is desired to run the reel continuously without interrupting it at any time as may be necessary when the gas is burning low and not developing enough heat to effect a complete toasting of the food products during one rotation of the reel then the attendant will move all of the tappets to the central position indicated by the dotted line 121ª of Fig. 23 and the top of the switch opening pin is moved toward one side or the other of the path of the tappets so that at no time will the reel be arrested in its rotation until this is deliberately accomplished by shifting one or the other of the tappets into a position in which it will shift the switch opening lever into its open position.

In case the food article or product which is being toasted is of such a character that it requires basting with water or the like during the toasting operation or would be improved in quality by such treatment, means may be provided for basting such articles during the toasting operation. This may be accomplished as for example by arranging a basting pan or trough 130 above the path of the sausage as they are moved by the lower part of the reel, this trough being adapted to receive water or other basting liquid which is introduced into this trough or pan through the open top thereof and discharged in the form of drops through openings 131 in the bottom of this pan upon the sausages as they pass underneath the pan. This pan may be supported in any suitable manner, for example by a pair of suspension bars 132 which are provided at their lower ends with hooks 133 which embrace opposite ends of this pan and also with hooks 134 at their upper ends which embrace the adjacent part of the axle 35.

The lower burners 88 are easy of access for lighting them upon opening the front door 91. Owing, however, to the fact that the upper burners 89 are arranged within the reel the same could not be lighted conveniently in the absence of some provision for this purpose. In order, therefore to facilitate the lighting of the upper burners 89 a curved crescent-shaped lighting burner 140 is provided which is arranged along one end of the several toasting burners 89 and provided with outlet openings 141 adjacent to each of the toasting burners. This lighting burner is supplied with gas from the main supply pipe or axle 35 at one end thereof by means of a branch pipe 142 which contains a valve 143. When, therefore, it is desired to light the upper toasting burners gas is first turned on the lighting burner 140 by opening the valve 143 and then lighting the gas issuing from the openings thereof. Thereafter the gas escaping from the toasting burners 89 upon opening the main valve 99 and cut-off valve 102, will be ignited from the lighting burner and then the latter may be again turned off by closing the valve 143 or the flames issuing therefrom may be left burning in readiness for subsequently lighting the toasting burners whenever desired.

It will, therefore, be obvious from the foregoing description that by means of this switch mechanism the attendant can selectively arrest the reel at any predetermined part of its rotation when a particular holder or station thereof is at the loading and unloading place of the compartment and thereby operate the apparatus in accordance with the manner in which the several holders have been loaded with food products or in accordance with some special conditions for toasting, cooking or otherwise treating different kinds of materials which are to be served to customers.

I claim as my invention:

1. An apparatus for toasting food articles comprising a movable carrier, and a holder for the food articles having a bottom part adapted to support said articles on the underside, front and rear parts extending upwardly from the front and rear ends of said bottom part for confining the food articles thereon and a hook detachably arranged at the upper end of said rear part and adapted to engage said carrier said front and rear parts being perforated and the space at two corresponding vertical edges thereof being unobstructed and the opposite vertical edges thereof being provided with inwardly projecting stop lugs.

2. An apparatus for toasting food articles, comprising a skeleton reel rotatable about a horizontal axis, an axle about which said reel turns, holders suspended from the peripheral parts of said reel and adapted to support the articles to be toasted, a liquid supply pan arranged within the reel and above the path of the holders on the lower part of the reel and provided in its bottom with openings through which the liquid is adapted to drip upon said articles, and suspension bars mounted on said axle and carrying said pan.

3. An apparatus for toasting food articles, comprising a rotatable reel adapted to support food articles to be toasted, an electric motor operatively connected with said reel and means operable by the rotation of the reel for controlling the operation of said motor comprising a switch arranged in the circuit of said motor, a plurality of tappets arranged on the periphery of the reel and adapted to operate said switch for opening the same, a support for each tappet movably mounted on the reel and adapted to move the respective tappet into different annular paths and a movable support for said switch adapted to move the latter into different positions relative to said tappets.

4. An apparatus for toasting food articles, comprising a rotatable reel adapted to support food articles to be toasted, an electric motor operatively connected with said reel and means operable by the rotation of the reel for controlling the operation of said motor comprising a switch arranged in the circuit of said motor, a plurality of tappets arranged on the periphery of the reel and adapted to operate said switch for opening the same, a support for each tappet movably mounted on the reel and adapted to move the respective tappet into different annular paths, a movable support for said switch adapted to move the latter into different positions relative to said tappets and stops for limiting the movement of said tappet supports on said reel.

5. An apparatus for toasting food articles, comprising a rotatable reel adapted to support food articles to be toasted, an electric motor operatively connected with said reel and means operable by the rotation of the reel for controlling the operation of said motor comprising a switch arranged in the circuit of said motor, a plurality of tappets arranged on the periphery of the reel and adapted to operate said switch for opening the same, a support for each tappet movably mounted on the reel and adapted to move the respective tappet into different annular paths, a movable support for said switch adapted to move the latter into different positions relative to said tappets and stops for limiting the movement of said switch support.

6. An apparatus for toasting food articles, comprising a rotatable reel adapted to support food articles to be toasted, an electric motor operatively connected with said reel and means operable by the rotation of the reel for controlling the operation of said motor comprising a switch having fixed contacts in circuit with said motor, a lever adapted to engage with said contacts, a manually operated push pin arranged on one arm of said lever, and tappets arranged on the reel and adapted to operate on the other arm of said lever.

7. An apparatus for toasting food articles, comprising a rotatable reel adapted to support food articles to be toasted, an electric motor operatively connected with said reel and means operable by the rotation of the reel for controlling the operation of said motor comprising a switch having fixed contacts in circuit with said motor, a lever adapted to engage with said contacts, a manually operated push pin arranged on one arm of said lever, a power operated push pin having a lower section connected with the other arm of said lever, an upper section mounted on the lower section and a spring interposed between said sections and a plurality of tappets mounted on the reel and adapted to engage the upper section of said power operated push pin.

In testimony whereof I affix my signature.

ROBERT O. HAMMOND.